(12) United States Patent
Sasaki et al.

(10) Patent No.: US 9,618,705 B2
(45) Date of Patent: Apr. 11, 2017

(54) RECEPTACLE CONNECTOR

(71) Applicant: SUMITOMO ELECTRIC INDUSTRIES, LTD., Osaka-shi, Osaka (JP)

(72) Inventors: Dai Sasaki, Yokohama (JP); Osamu Shimakawa, Yokohama (JP); Hajime Arao, Yokohama (JP); Takuro Watanabe, Yokohama (JP); Motoyoshi Kimura, Komaki (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/957,753

(22) Filed: Dec. 3, 2015

(65) Prior Publication Data
US 2016/0187595 A1    Jun. 30, 2016

(30) Foreign Application Priority Data

Dec. 25, 2014  (JP) ................. 2014-261858

(51) Int. Cl.
*G02B 6/38*       (2006.01)
*G02B 6/32*       (2006.01)

(52) U.S. Cl.
CPC ............. *G02B 6/3885* (2013.01); *G02B 6/32* (2013.01); *G02B 6/3882* (2013.01); *G02B 6/3821* (2013.01); *G02B 6/3853* (2013.01); *G02B 6/3893* (2013.01)

(58) Field of Classification Search
CPC ..................................................... G02B 6/3875
See application file for complete search history.

(56) References Cited

U.S. PATENT DOCUMENTS 4,781,431 A    11/1988  Wesson et al.
6,012,852 A     1/2000  Kadar-Kallen et al.

FOREIGN PATENT DOCUMENTS

EP    0895109 A2    2/1999
EP    0895109 A3    2/1999

*Primary Examiner* — Chad Smith
(74) *Attorney, Agent, or Firm* — Drinker Biddle & Reath LLP

(57) ABSTRACT

A receptacle connector includes a receptacle ferrule, a receptacle housing and a spacer. The receptacle ferrule has a first front end portion having a receptacle interface part In the receptacle housing, the receptacle ferrule and a plug connector having a second front end portion having a plug interface part configured to be optically coupled with the receptacle interface part are to be accommodated. The spacer has a first surface configured to contact the first front end portion, and a second surface configured to contact the second front end portion. The spacer is arranged in the receptacle housing. At a state where the first front end portion is contacted to the first surface of the spacer and the second front end portion is contacted to the second surface of the spacer, the receptacle interface part and the plug interface part face each other at a predetermined interval.

9 Claims, 13 Drawing Sheets

RECEPTACLE CONNECTOR

CROSS-REFERENCE TO RELATED APPLICATION

The present application claims priority from Japanese Patent Application No. 2014-261858 filed on Dec. 25, 2014, the entire content of which is incorporated herein by reference.

BACKGROUND

Technical Field

The present disclosure relates to a receptacle connector.

Related Art

An optical connector coupling system configured to optically couple a plurality of optical fibers via beam expanding elements has been known (for example, refer to Patent Document 1). According to the optical connector coupling system disclosed in Patent Document 1, a male ferrule and a female ferrule are arranged to face each other so that end surfaces thereof are contacted, and are thus positioned with respect to each other. In order to optically couple two beam expanding elements, it is required to form a predetermined interval therebetween. Therefore, each beam expanding element is provided at a position recessed from the ferrule end surface.

[Patent Document 1] U.S. Pat. No. 6,012,852B

However, according to the ferrule disclosed in Patent Document 1, since it is necessary to arrange the beam expanding element at the position recessed from the ferrule end surface, a degree of design freedom of the ferrule is restrained.

SUMMARY

Exemplary embodiments of the invention provide a receptacle connector capable of providing an optical connector coupling system that can increase a degree of design freedom of a ferrule.

A receptacle connector according to an exemplary embodiment of the invention comprises:
a receptacle ferrule having:
a first holding part configured to hold an end portion of a first optical fiber, and
a first front end portion having a receptacle interface part configured to be optically coupled with the first optical fiber;
a receptacle housing in which the receptacle ferrule and a plug connector having a second front end portion having a plug interface part configured to be optically coupled with the receptacle interface part are to be accommodated; and
a spacer having:
a first surface configured to contact the first front end portion;
a second surface positioned at an opposite side to the first surface and configured to contact the second front end portion, and
a light transmission part configured to enable a light beam propagating between the receptacle interface part and the plug interface part to pass therethrough,
the spacer being arranged in the receptacle housing,
wherein at a state where the first front end portion is contacted to the first surface of the spacer and the second front end portion is contacted to the second surface of the spacer, the receptacle interface part and the plug interface part face each other at a predetermined interval.

According to the exemplary embodiment of the present invention, it is possible to provide the receptacle connector capable of providing the optical connector coupling system that can increase the degrees of design freedom of the receptacle ferrule and plug ferrule.

DETAILED DESCRIPTION

Figure 1:
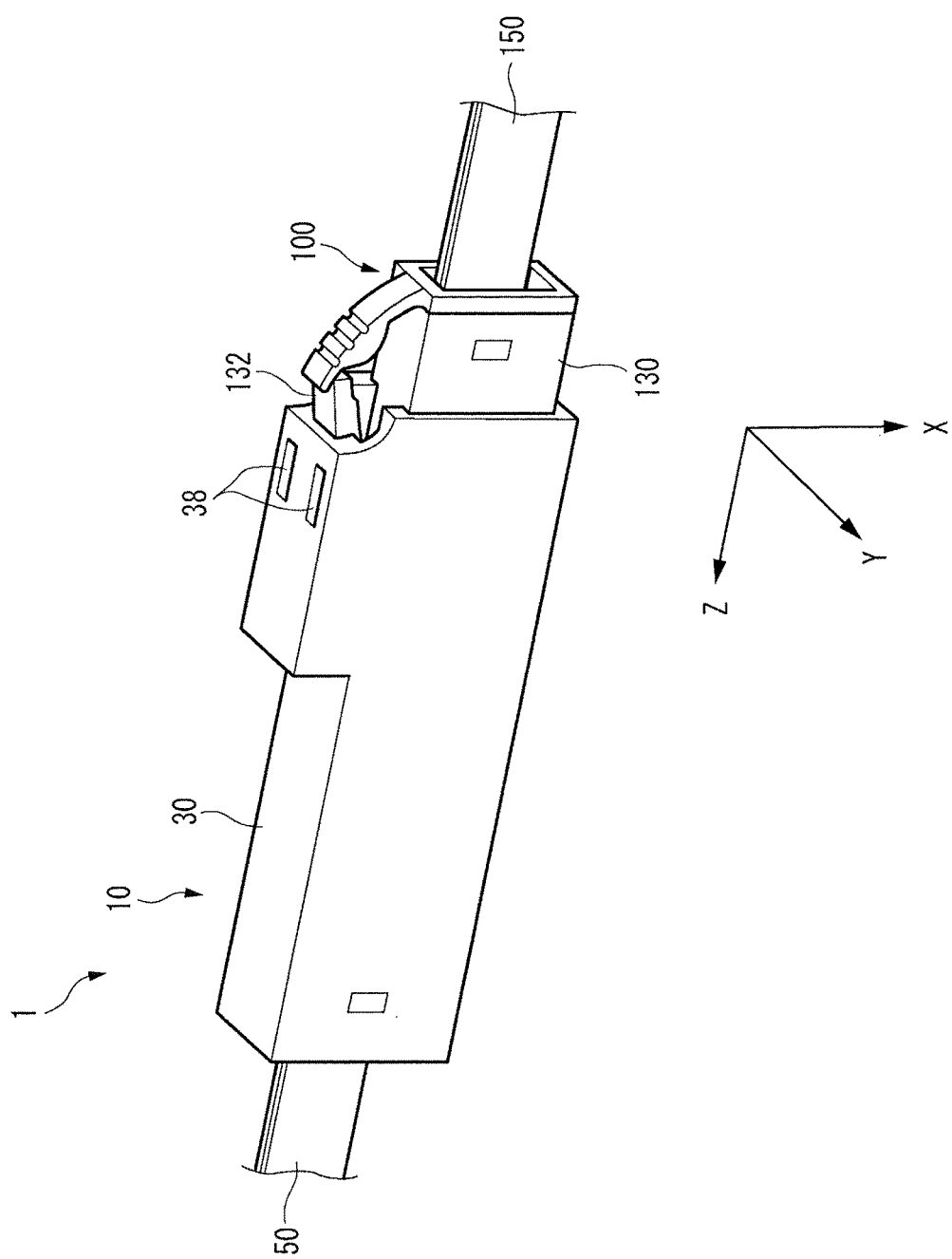
FIG. 1 is a perspective view depicting an optical connector coupling system having a receptacle connector according to an exemplary embodiment of the present invention.

[Description of Exemplary Embodiments of Present Invention]

An outline of exemplary embodiments of the present invention is described.

(1) A receptacle connector comprises:
a receptacle ferrule having:
a first holding part configured to hold an end portion of a first optical fiber, and a first front end portion having a receptacle interface part configured to be optically coupled with the first optical fiber;

a receptacle housing in which the receptacle ferrule and a plug connector having a second front end portion having a plug interface part configured to be optically coupled with the receptacle interface part are to be accommodated; and a spacer having:

a first surface configured to contact the first front end portion;

a second surface positioned at an opposite side to the first surface and configured to contact the second front end portion, and a light transmission part configured to enable a light beam propagating between the receptacle interface part and the plug interface part to pass therethrough, the spacer being arranged in the receptacle housing, wherein at a state where the first front end portion is contacted to the first surface of the spacer and the second front end portion is contacted to the second surface of the spacer, the receptacle interface part and the plug interface part face each other at a predetermined interval.

According to the above configuration, it is possible to provide the receptacle connector capable of providing the optical connector coupling system that can increase the degrees of design freedom of the receptacle ferrule and plug ferrule.

(2) In the receptacle connector according to (1), at a first state where the receptacle interface part and the plug interface part are not positioned with respect to each other via the spacer, the second surface of the spacer is contacted to an inner wall surface defining a cavity of the receptacle housing, and at a second state where the receptacle interface part and the plug interface part are positioned with respect to each other via the spacer, the second surface of the spacer is spaced from the inner wall surface.

According to the above configuration, it is possible to provide the receptacle connector of which reliability against an external force is improved.

(3) In the receptacle connector according to (2), a distance between the first front end portion and the second surface of the spacer at the second state is smaller than a distance between the first front end portion and the second surface of the spacer at the first state.

According to the above configuration, it is possible to provide the receptacle connector of which reliability against the external force is improved.

(4) In the receptacle connector according to (3), a distance between the first surface and the second surface of the spacer at the first state is the same as a distance between the first surface and the second surface of the spacer at the second state.

According to the above configuration, it is possible to provide the receptacle connector of which reliability against the external force is improved by the relatively simple spacer structure configured by a single member, for example.

(5) In the receptacle connector according to (3), a distance between the first surface and the second surface of the spacer at the second state is smaller than a distance between the first surface and the second surface of the spacer at the first state.

According to the above configuration, it is possible to easily implement a state where the second surface of the spacer is contacted to or spaced from the inner wall surface of the receptacle housing, by the change in the distance between the first surface and the second surface of the spacer.

(6) The receptacle connector according to one of (2) to (5), further comprises:

a support member arranged in the receptacle housing so as to support the receptacle ferrule, and configured to restrain movement of the receptacle ferrule in an insertion direction in which the plug connector is to be inserted into the receptacle housing; and a first elastic member configured to elastically connect the first front end portion and the spacer, wherein the first elastic member is configured to be elastically deformed so that a distance between the first front end portion and the second surface of the spacer at the second state is smaller than a distance between the first front end portion and the second surface of the spacer at the first state.

According to the above configuration, the first elastic member configured to elastically connect the first front end portion and the spacer is elastically deformed, so that the distance between the first front end portion and the second surface of the spacer is changed. Thereby, it is possible to easily implement a state where the second surface of the spacer is contacted to or spaced from the inner wall surface of the receptacle housing.

(7) The receptacle connector according to one of (2) to (5), further comprises:

a support member arranged in the receptacle housing so as to support the receptacle ferrule, and configured to restrain movement of the receptacle ferrule in an insertion direction in which the plug connector is to be inserted into the receptacle housing; and a second elastic member arranged between the receptacle ferrule and the support member and configured to be elastically deformed in the insertion direction so that the second surface of the spacer is spaced from the inner wall surface.

According to the above configuration, the second elastic member is elastically deformed in the insertion direction. Thereby, it is possible to easily implement a state where the second surface of the spacer is contacted to or spaced from the inner wall surface of the receptacle housing.

(8) The receptacle connector according to one of (2) to (5), further comprises:

a support member arranged in the receptacle housing so as to support the receptacle ferrule, and configured to restrain movement of the receptacle ferrule in an insertion direction in which the plug connector is to be inserted into the receptacle housing, wherein a part of the support member is configured to be elastically deformed in the insertion direction so that the second surface of the spacer is spaced from the inner wall surface.

According to the above configuration, a part of the support member is elastically deformed in the insertion direction. Thereby, it is possible to easily implement a state where the second surface of the spacer is contacted to or spaced from the inner wall surface of the receptacle housing.

(9) In the receptacle connector according to one of (1) to (8), the receptacle housing has a first cavity configured to accommodate therein the receptacle ferrule and the spacer, and a second cavity configured to accommodate therein the plug connector, and an opening area of the first cavity on a cross-sectional surface orthogonal to an insertion direction in which the plug connector is to be inserted into the receptacle housing is smaller than an opening area of the second cavity.

According to the above configuration, it is possible to suppress the dust and the like from being attached to the receptacle interface part and the plug interface part at the state where the receptacle interface part and the plug interface part are positioned with respect to each other via the spacer.

(10) The receptacle connector according to one of (1) to (9), further comprises:

a guide pin for a multimode optical fiber, wherein the receptacle interface part is configured to expand a light beam emitted from the first optical fiber, wherein the plug interface part is configured to optically couple with the second optical fiber and to condense the light beam emitted from the receptacle interface part on the second optical fiber, wherein the first optical fiber and the second optical fiber are optical fibers for a single mode, and wherein the receptacle interface part and the plug interface part are positioned with respect to each other at a state where the guide pin is inserted into a guide hole formed at the receptacle ferrule and a guide hole formed at the plug connector.

According to the above configuration, it is possible to save the manufacturing cost of the receptacle connector by using the relatively inexpensive guide pin for a multimode optical fiber.

[Details of Exemplary Embodiment of Present Invention]

Hereinafter, an exemplary embodiment of the present invention will be described with reference to the drawings. In the descriptions of the exemplary embodiment, the descriptions of the members having the same reference numerals as the already described members are omitted for convenience of explanations. Also, the sizes of the respective members shown in the drawings may be different from the sizes of the actual members for convenience of explanations.

Also, in the descriptions of the exemplary embodiment, an X-axis direction, a Y-axis direction, and a Z-axis direction are appropriately mentioned so as to easily understand the present invention. The directions are relative directions set for an optical connector coupling system 1 shown in FIG. 1. Therefore, it should be noted that when the optical connector coupling system 1 shown in FIG. 1 is rotated in a predetermined direction, at least one of the X-axis direction, the Y-axis direction, and the Z-axis direction is changed.

Here, the X-axis direction includes a +X direction ('+' direction is set as a vector direction) and a −X direction. Likewise, the Y-axis direction includes a +Y direction and a −Y direction, and the Z-axis direction includes a +Z direction and a −Z direction. In the meantime, when describing a specific direction (vector), the direction is explicitly denoted as the +X direction, the −Y direction, and the like.

FIG. 1 is a perspective view depicting an optical connector coupling system 1 having a receptacle connector 10 according to an exemplary embodiment of the present invention. As shown in FIG. 1, the optical connector coupling system 1 has an optical cable 50, an optical cable 150, a receptacle connector 10, and a plug connector 100. In FIG. 1, the plug connector 100 is accommodated in a receptacle housing 30 of the receptacle connector 10. A pair of latch engaging parts 38 provided for the receptacle housing 30 and a latch 132 of the plug connector 100 are engaged each other, so that the plug connector 100 is fixed to the receptacle housing 30.

Figure 2:
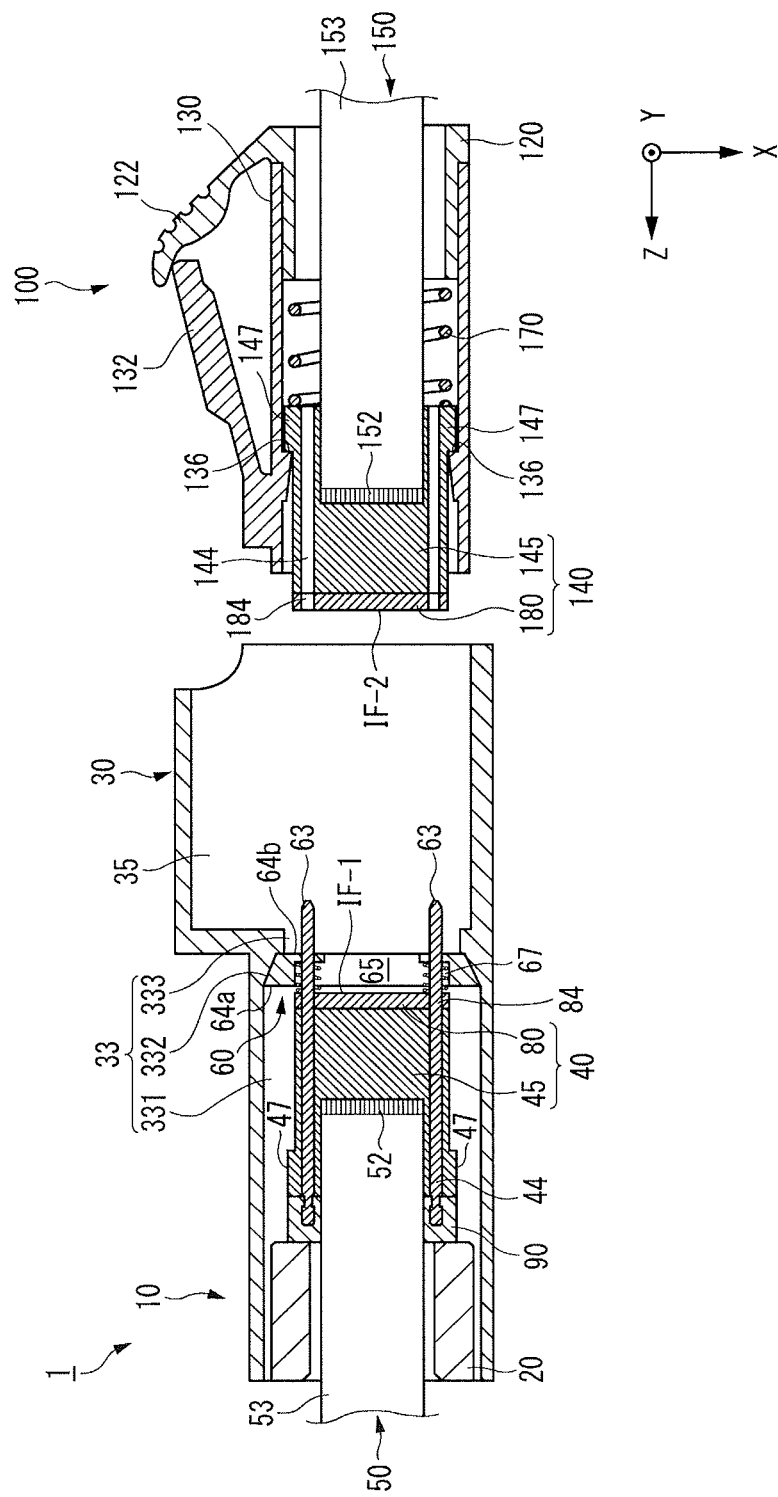
FIG. 2 is a sectional view of the optical connector coupling system at a state (first state) where a receptacle interface part and a plug interface part are not positioned with respect to each other via a spacer.

Next, a configuration of the optical connector coupling system 1 is described in detail with reference to FIG. 2. FIG. 2 is a sectional view of the optical connector coupling system 1 perpendicular to the Y-axis direction at a state (hereinafter, referred to as a first state) at which a receptacle interface part IF-1 and a plug interface part IF-2 are not positioned with respect to each other via a spacer 60.

The receptacle connector 10 has the receptacle housing 30, a receptacle ferrule 40, a pair of guide pins 63, a pin keeper 90, a support member 20, a spacer 60, and a pair of coil springs 67 (the first elastic member).

The receptacle housing 30 has a first cavity 33 and a second cavity 35. The first cavity 33 has a large diameter part 331, a tapered part 332, and a small diameter part 333. In the large diameter part 331, the receptacle ferrule 40, the pin keeper 90, and the support member 20 are accommodated. In the tapered part 332, the spacer 60 is accommodated. The small diameter part 333 is configured to communicate with the second cavity 35. The second cavity 35 is configured to accommodate therein the plug connector 100.

A width of the tapered part 332 in the X-axis direction is set to be smaller as the tapered part is closer to the small diameter part 333 in the Z-axis direction. The tapered part 332 has the same shape in the YZ plane, too, and a width of the tapered part 332 in the Y-axis direction is set to be smaller as the tapered part is closer to the small diameter part 333 in the Z-axis direction.

An opening area of the first cavity 33 on a cross-sectional surface perpendicular to an insertion direction (the Z-axis direction) in which the plug connector 100 is to be inserted into the receptacle housing 30 is set to be smaller than an opening area of the second cavity 35.

Figure 3:
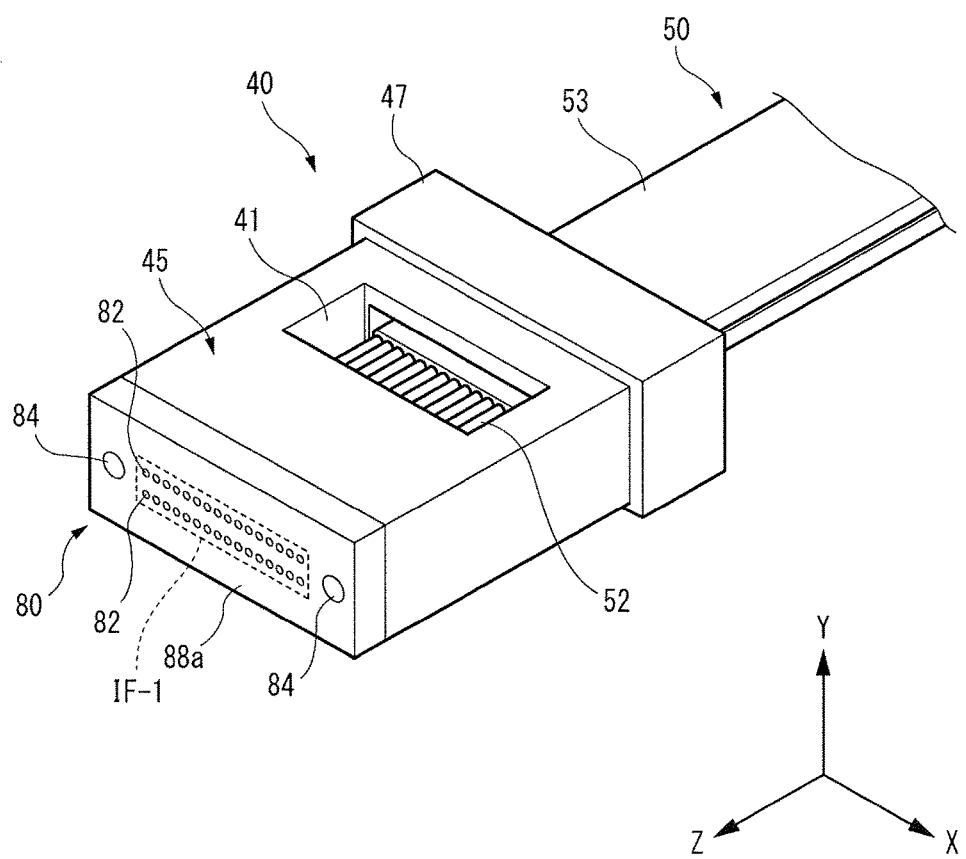
FIG. 3 is an enlarged perspective view depicting a receptacle ferrule and an optical cable shown in FIG. 2.

Next, structures of the receptacle ferrule 40 and the optical cable 50 are described with reference to FIG. 3. FIG. 3 is an enlarged perspective view depicting the receptacle ferrule 40 and the optical cable 50 shown in FIG. 2.

The optical cable 50 has a plurality of first optical fibers 52 arranged in parallel in the X-axis direction, and a covering 53 configured to integrally cover the plurality of first optical fibers 52. In this exemplary embodiment, the optical cable 50 is held by the receptacle ferrule 40 with being piled up in two stages in the Y-axis direction. Meanwhile, in the below descriptions, the optical cable 50 piled up in two stages is simply referred to as the optical cable 50 without particularly discriminating the same, for convenience of explanations.

The plurality of first optical fibers 52 is exposed from the covering 53 at an end portion of the optical cable 50. The first optical fiber 52 has a core layer through which the light propagates and a cladding layer configured to cover the core layer. In this exemplary embodiment, the first optical fiber 52 is a single mode optical fiber. However, a multimode optical fiber may also be applied.

The receptacle ferrule 40 has a first main body part 45 configured to hold end portions of the first optical fibers 52, and a first lens array 80 (first front end portion). The first main body part 45 has a window part 41, a plurality of optical fiber holding holes (not shown) arranged in parallel in the X-axis direction, a pair of guide pin insertion holes 44 (refer to FIG. 2), and a rear end portion 47. The first main body part 45 shown in FIG. 3 is an MT-type ferrule. However, the shape of the first main body part 45 is not limited thereto.

The respective optical fiber holding holes and the guide pin insertion holes 44 are formed to extend in the Z-axis direction at the first main body part 45. The respective first optical fibers 52 exposed from the covering 53 and separated into a single fiber are inserted into the corresponding optical fiber holding holes, so that they are guided towards a front surface of the first main body part 45. The respective first optical fibers 52 are fixed to the receptacle ferrule 40 by an adhesive supplied from the window part 41. In this way, the respective first optical fibers 52 are held by the corresponding optical fiber holding holes. Also, the front surface of the receptacle ferrule 40 is ground, for example, so that the end surfaces of the respective first optical fibers 52 are flush with the front surface of the receptacle ferrule 40. The rear end portion 47 has a substantially cuboid shape and is configured so that an insertion opening (not shown) into which the optical cable 50 is inserted communicates with the optical fiber holding holes.

The first lens array 80 has a receptacle interface part IF-1 optically coupled with the first optical fibers 52, and a pair of guide holes 84. In particular, the receptacle interface part IF-1 is configured to expand and emit light beams emitted from the first optical fibers 52. The receptacle interface part IF-1 has a plurality of GRIN (Gradient-Index) lenses 82 arranged in parallel in the X-axis direction. Also, the first lens array 80 has a front surface 88a, and a rear surface positioned at an opposite side to the front surface 88a. The GRIN lenses 82 are held to extend from the front surface 88a to the rear surface in the Z-axis direction in the first lens array 80. The front surface 88a and the rear surface are smoothed by the grinding, for example.

The first lens array 80 is arranged on the first main body part 45 so that a rear surface thereof is contacted to the front surface of the first main body part 45. At a state where the first lens array 80 is arranged on the front surface of the first main body part 45, the respective GRIN lenses 82 are positioned with respect to the end surfaces of the first optical fibers 52 accommodated in the corresponding optical fiber holding holes.

The GRIN lenses 82 are configured so that a refractive index thereof gradually changes from a central part towards an outer periphery. Also, the GRIN lenses 82 are configured to expand the light beams emitted from the first optical fibers 52. For example, the GRIN lenses 82 are configured to collimate the diverging lights emitted from the first optical fibers 52 and to emit the parallel lights in the +Z direction. Also, the GRIN lenses 82 are configured to condense the light beams, which are the parallel lights incident to the GRIN lenses 82 of the receptacle interface part IF-1 from the plug interface part IF-2 (which will be described later), and to couple the same to the first optical fibers 52.

As shown in FIG. 2, the pair of guide pins 63 is supported by the pin keeper 90, and extends from the first cavity 33 to the second cavity 35 in the Z-axis direction. The respective guide pins 63 are inserted into the corresponding guide pin insertion holes 44 and guide holes 84, so that the GRIN lenses 82 are positioned with respect to the end surfaces of the first optical fibers 52 exposed from the optical fiber holding holes formed at the receptacle ferrule 40. In this way, the respective GRIN lenses 82 are optically coupled with the corresponding first optical fibers 52. Further, since the respective guide holes 84 are positioned with respect to the corresponding guide pin insertion holes 44, the respective guide holes 84 communicate with the corresponding guide pin insertion holes 44.

Also, the guide pin 63 is a guide pin for a multimode optical fiber, and is manufactured so that an error of an outer diameter of the guide pin at each position in an axis direction thereof as regards a design value is equal to or less than ±1.0 µm. The merits of the guide pin for a multimode optical fiber will be described later.

The support member 20 is arranged in the first cavity 33 so that it supports the receptacle ferrule 40 via the pin keeper 90, and is configured to restrain movement of the receptacle ferrule 40 in the insertion direction (Z-axis direction). Also, the support member 20 is accommodated so that it can be moved relative to the receptacle housing 30 in the XYZ-axis directions (hereinafter, also referred to as a floating state).

As shown in FIGS. 2 and 5A, the spacer 60 is accommodated in the tapered part 332. The spacer 60 has a first surface 64a facing the first lens array 80, a second surface 64b positioned at an opposite side to the first surface 64a, an inclined side surface 64c positioned between the first surface 64a and the second surface 64b in the Z-axis direction, and an opening 65 (an example of the light transmission part) penetrating the spacer 60 in the Z-axis direction. The spacer 60 further has recess portions 66 and a pair of guide pin insertion holes configured to communicate with the recess portions 66 in the Z-axis direction.

A pair of coil springs 67 configured to elastically connect the first lens array 80 and the spacer 60 is provided on bottom surfaces of the recess portions 66. The coil spring 67 is arranged on the bottom surface of the recess portion 66 so that the guide pin 63 is accommodated therein. Meanwhile, in the exemplary embodiment, the coil spring 67 may be another member having elasticity.

At the first state shown in FIG. 5A, elastic forces of the coil springs 67 are applied in the −Z direction, so that the spacer 60 is pressed to inner wall surfaces 36a, 36b defining the first cavity 33 of the receptacle housing 30. At this state, the second surface 64b of the spacer 60 is contacted to the inner wall surface 36a of the receptacle housing 30, and the inclined side surface 64c of the spacer 60 is contacted to the inner wall surface 36b. In the meantime, the first surface 64a of the spacer 60 and the first lens array 80 are spaced from each other. In the meantime, the inclined side surface 64c is contacted to the inner wall surface 36b in the YZ plane, too.

Returning to FIG. 2, the optical cable 150 and the plug connector 100 are described.

The optical cable 150 has a plurality of second optical fibers 152 arranged in parallel in the X-axis direction and a covering 153 configured to integrally cover the plurality of second optical fibers 152. The optical cable 150 is held by a plug ferrule 140 with being piled up in two stages in the Y-axis direction, like the optical cable 50 shown in FIG. 3. At an end portion of the optical cable 150, the plurality of second optical fibers 152 has a core layer through which the light propagates and a cladding layer configured to cover the core layer, respectively. In this exemplary embodiment, the second optical fiber 152 is a single mode optical fiber. However, a multimode optical fiber may also be applied.

The plug connector 100 has the plug ferrule 140, a plug housing 130, a spring 170, a support member 120, the latch 132 and a latch restraint part 122.

The plug ferrule 140 has the same configuration as the receptacle ferrule 40 shown in FIG. 3, and has a second main body part 145 configured to hold end portions of the second optical fibers 152 and a second lens array 180 (second front end portion). The second main body part 145 has optical fiber holding holes (not shown) configured to hold the end portions of the second optical fibers 152, a pair of guide pin insertion holes 144, and a rear end portion 147. The respective optical fiber holding holes and the guide pin insertion holes 144 are formed to extend in the Z-axis direction at the second main body part 145. The respective second optical fibers 152 exposed from the covering 153 and separated into a single fiber are inserted into the corresponding optical fiber holding holes, so that they are guided towards a front surface of the second main body part 145.

The second lens array 180 has the plug interface part IF-2 optically coupled with the second optical fiber 152, and a pair of guide holes 184. In particular, the plug interface part IF-2 is configured to expand and emit light beams emitted from the second optical fibers 152. The plug interface part IF-2 has a plurality of GRIN lenses 182 (refer to FIG. 6) arranged in parallel in the X-axis direction. Each guide hole 184 penetrates the second lens array 180 in the Z-axis direction and is positioned with respect to the corresponding guide pin insertion hole 144 and communicates with the same.

The plug housing 130 is configured to accommodate therein the plug ferrule 140, the spring 170 and the support member 120. At the first state shown in FIG. 2, the spring 170 presses the plug ferrule 140 in the +Z direction but the rear end portion 147 of the plug ferrule 140 is contacted to the inner wall surface 136 of the plug housing 130. Therefore, the plug ferrule 140 is stopped with being applied with the pressing force from the spring 170.

The latch 132 is engaged with the latch engaging parts 38 shown in FIG. 1, so that the plug connector 100 is fixed to the receptacle housing 30. Also, the latch restraint part 122 is provided on the support member 120 so that an angle formed between the latch 132 and the plug housing 130 is not enlarged.

Figure 4:
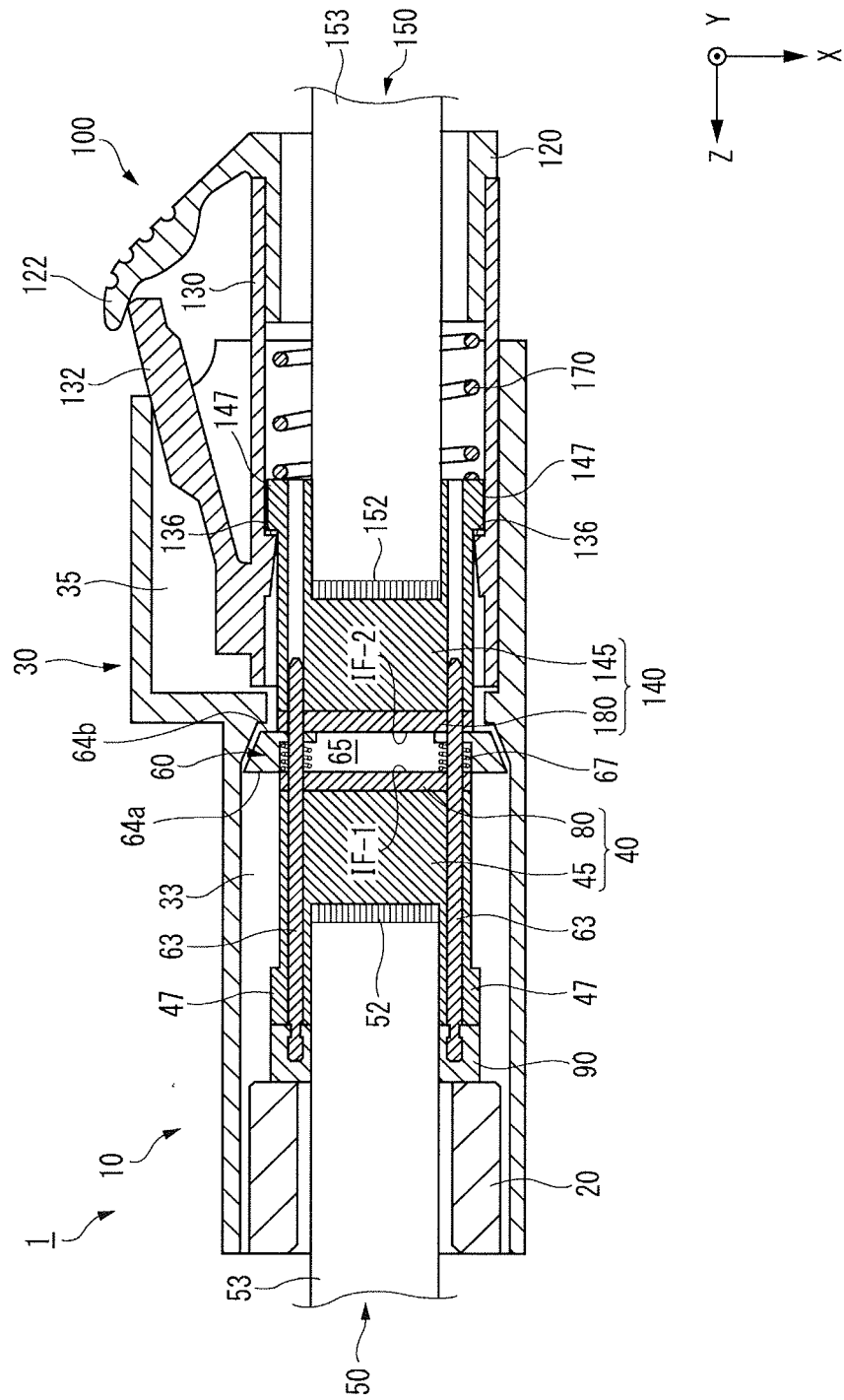
FIG. 4 is a sectional view of the optical connector coupling system at a state (second state) where the receptacle interface part and the plug interface part are positioned with respect to each other via the spacer.
Figure 5:
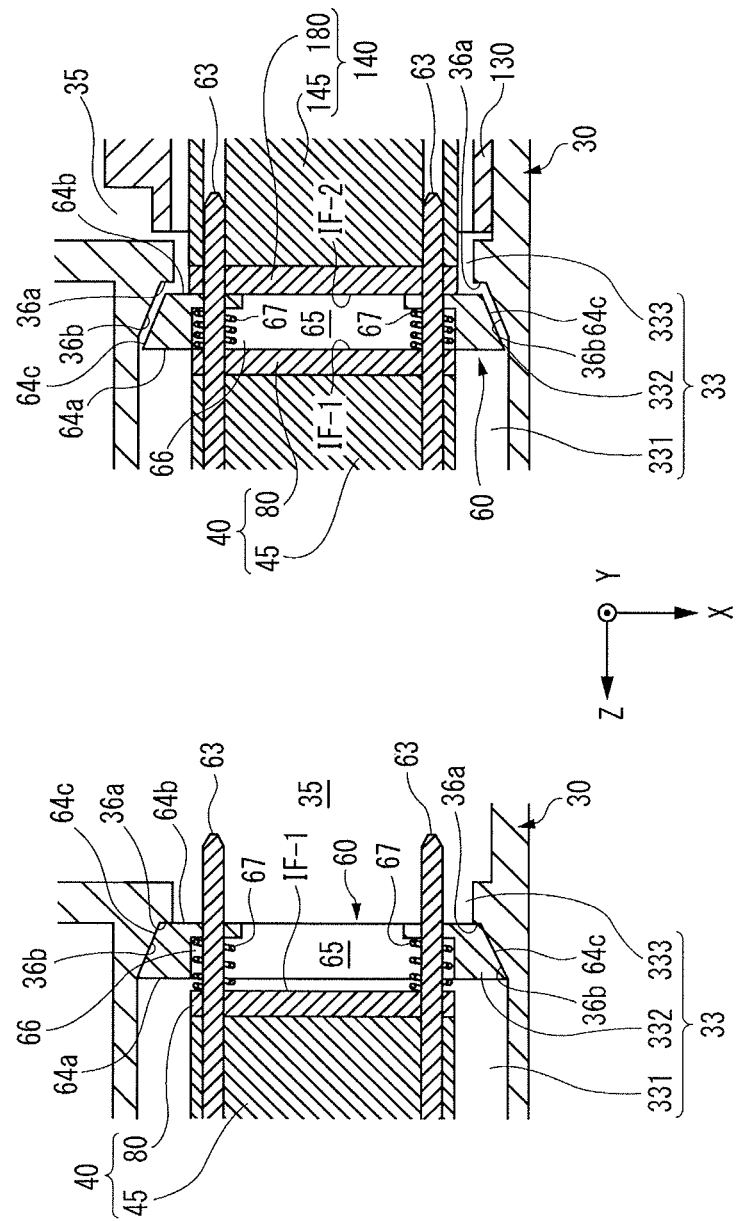
FIG. 5A is an enlarged sectional view depicting the spacer shown in FIG. 2 and the vicinity thereof.
FIG. 5B is an enlarged sectional view depicting the spacer shown in FIG. 4 and the vicinity thereof.

Subsequently, a state (hereinafter, referred to as a second state) where the receptacle interface part IF-1 and the plug interface part IF-2 are positioned with respect to each other via the spacer 60 is described with reference to FIGS. 3 to 5B. FIG. 4 is a sectional view of the optical connector coupling system 1 at the second state. FIG. 5B is an enlarged sectional view depicting the spacer shown in FIG. 4 and the vicinity thereof.

The plug connector 100 is moved in the +Z direction from the first state shown in FIG. 2, so that the plug connector 100 is accommodated in the second cavity 35 of the receptacle housing 30 and the guide pins 63 are inserted into the pair of guide holes 184 and the guide pin insertion holes 144 of the plug connector 100. Further, when the plug connector 100 is moved in the +Z direction, the front surface of the second lens array 180 is first contacted to the second surface 64b of the spacer 60. Then, when the plug connector 100 is further moved in the +Z direction at the state where the front surface of the second lens array 180 is contacted to the second surface 64b of the spacer 60, the coil springs 67 configured to elastically connect the first lens array 80 and the spacer 60 are contracted in the Z-axis direction, so that the spacer 60 is moved in the +Z direction (this phenomenon may also be referred to as 'spacer back'). As a result, the first surface 64a of the spacer 60 is contacted to the first lens array 80, and the second surface 64b of the spacer 60 is spaced from the inner wall surface 36a of the receptacle housing 30. At this state, the latch 132 is engaged with the latch engaging parts 38, and the plug connector 100 is fixed to the receptacle housing 30.

At the second state shown in FIGS. 4 and 5B, the receptacle interface part IF-1 and the plug interface part IF-2 are arranged to face each other at a predetermined interval with the first lens array 80 being contacted to the first surface 64a of the spacer 60 and the second lens array 180 being contacted to the second surface 64b of the spacer 60. In the exemplary embodiment, the predetermined interval is a distance between the first surface 64a and the second surface 64b in the Z-axis direction, and can be appropriately set depending on the design of the spacer 60.

At the second state, the receptacle ferrule 40 and the plug ferrule 140 are positioned and connected with respect to each other via the guide pins 63. Further, the first optical fibers 52 are optically coupled with the second optical fibers 152 via the receptacle interface part IF-1, the opening 65 of the spacer 60 and the plug interface part IF-2. Here, the opening 65 of the spacer 60 is configured so that the light beam propagating between the receptacle interface part IF-1 and the plug interface part IF-2 can penetrate therethrough.

Also, at the second state shown in FIG. 5B, the second surface 64b of the spacer 60 is spaced from the inner wall surface 36a. Further, clearances are formed between the inclined side surface 64c of the spacer 60 and the inner wall surface 36b in the X-axis direction and the Y-axis direction, respectively. In this way, at the second state, the spacer 60 is accommodated in the receptacle housing 30 at the floating state.

(Operational Effects of Receptacle Connector 10 and Optical Connector Coupling System 1 of Exemplary Embodiment)

Next, operational effects of the receptacle connector 10 and the optical connector coupling system 1 according to the exemplary embodiment are described.

According to the receptacle connector 10 of the exemplary embodiment, when optically coupling the receptacle connector 10 and the plug connector 100, if the first lens array 80 is contacted to the first surface 64a of the spacer 60 and the second lens array 180 is contacted to the second surface 64b of the spacer 60, the receptacle interface part IF-1 and the plug interface part IF-2 can be made to face each other at the predetermined interval (a thickness of the spacer 60 in the Z-axis direction).

Since the receptacle connector 10 is provided with the spacer 60, it is possible to make the receptacle interface part IF-1 and the plug interface part IF-2 face each other at the predetermined interval, irrespective of the formation position of the receptacle interface part IF-1 or the plug interface part IF-2. For example, even when the receptacle interface part IF-1 and the plug interface part IF-2 are respectively provided on the end surface of the receptacle ferrule 40 and the end surface of the plug connector 100, the receptacle interface part IF-1 and the plug interface part IF-2 can be made to face each other at the predetermined interval. Therefore, it is possible to provide the receptacle connector 10 capable of providing the optical connector coupling system 1 that can increase the degrees of design freedom of the receptacle ferrule 40 and the plug ferrule 140.

Also, at the first state shown in FIG. 5A, since the second surface 64b of the spacer 60 is contacted to the inner wall surfaces 36a, 36b of the receptacle housing 30, it is possible to determine the accommodation position of the spacer 60 by the inner wall surfaces 36a, 36b.

On the other hand, at the second state shown in FIG. 5B, since the second surface 64b of the spacer 60 is spaced from the inner wall surface 36a, when the external force is applied to the receptacle housing 30, the external force is difficult to be transmitted to the spacer 60 via the inner wall surface 36a. Thereby, the external force is difficult to have an adverse influence on the optical coupling between the receptacle ferrule 40 and the plug ferrule 140 contacting the spacer 60. Therefore, it is possible to provide the receptacle connector 10 of which reliability against the external force is improved.

Further, in the exemplary embodiment, at the second state, the clearances are formed between the inclined side surface 64c of the spacer 60 and the inner wall surface 36b in the X-axis direction and the Y-axis direction, respectively. For this reason, the external force is difficult to be transmitted to the spacer 60 through the inner wall surface 36b.

Also, according to the spacer 60 of the exemplary embodiment, a distance between the first lens array 80 and the second surface 64b of the spacer 60 at the second state shown in FIG. 5B is smaller than a distance between the first lens array 80 and the second surface 64b of the spacer 60 at the first state shown in FIG. 5A. In this way, the distance between the first lens array 80 and the second surface 64b is changed, so that it is possible to implement the state where the second surface 64b of the spacer 60 is contacted to or spaced from the inner wall surface 36a of the receptacle housing 30.

Also, according to the spacer 60 of the exemplary embodiment, a distance between the first surface 64a and the second surface 64b at the first state is the same as a distance between the first surface 64a and the second surface 64b at the second state. In this way, for example, it is possible to provide the receptacle connector 10 of which reliability against the external force is improved by the relatively simple spacer structure configured by the single member.

Also, the coil springs 67 configured to elastically connect the spacer 60 and the first lens array 80 are elastically deformed (contracted) so that the distance between the first lens array 80 and the second surface 64b of the spacer 60 at the second state is smaller than the distance between the first lens array 80 and the second surface 64b at the first state. Therefore, the coil springs 67 are elastically deformed, so that the distance between the first lens array 80 and the second surface 64b is changed. Thereby, it is possible to easily implement the state where the second surface 64b is contacted to or spaced from the inner wall surface 36a of the receptacle housing 30.

Further, the elastic force of the coil spring 67 in the Z-axis direction is set to be less than the elastic force of the spring 170 of the plug connector 100 in the Z-axis direction. Thereby, when moving the plug connector 100 in the +Z direction, the second surface 64b of the spacer 60 can be spaced from the inner wall surface 36a.

At the second state shown in FIG. 4, the plug ferrule 140 is slightly retreated in the −Z direction with respect to the plug housing 130. At this time, a slight clearance occurs in the Z-axis direction between the rear end portion 147 of the plug ferrule 140 and the inner wall surface 136 of the plug housing 130. Thereby, at the second state, the plug ferrule 140 is accommodated in the plug housing 130 at the floating state.

Meanwhile, in the receptacle connector 10, the support member 20 is accommodated in the receptacle housing 30 at the floating state. For this reason, the receptacle ferrule 40 connected to the support member 20 via the pin keeper 90 is accommodated in the receptacle housing 30 at the floating state.

In this way, at the second state, the receptacle ferrule 40 and the spacer 60 are accommodated in the receptacle housing 30 at the floating state, and the plug ferrule 140 is accommodated in the plug housing 130 at the floating state.

Therefore, even when the external force is applied to the receptacle housing 30, the spacer 60, the receptacle ferrule 40 and the plug ferrule 140 are integrally moved, so that the external force is difficult to have an adverse influence on the optical coupling between the receptacle interface part IF-1 and the plug interface part IF-2. Therefore, it is possible to provide the optical connector coupling system 1 of which reliability against the external force is improved.

Also, as shown in FIG. 5B, since the second lens array 180 of the plug ferrule 140 protrudes from the plug housing 130 in the +Z direction, the plug housing 130 is accommodated in the second cavity 35 and the second lens array 180 is accommodated in the first cavity 33. In this way, the receptacle interface part IF-1 and the plug interface part IF-2 are arranged in the first cavity 33.

Here, since the opening area of the first cavity 33 on the cross-sectional surface perpendicular to the insertion direction (Z-axis direction) is set to be smaller than the opening area of the second cavity 35, it is possible to suppress the dust and the like existing at the outside from being introduced into the first cavity 33 through the second cavity 35. Therefore, it is possible to suppress the dust and the like from being attached to the receptacle interface part IF-1 and the plug interface part IF-2 arranged in the first cavity 33.

(Optical Coupling Between First Optical Fiber 52 and Second Optical Fiber 152)

Figure 6:
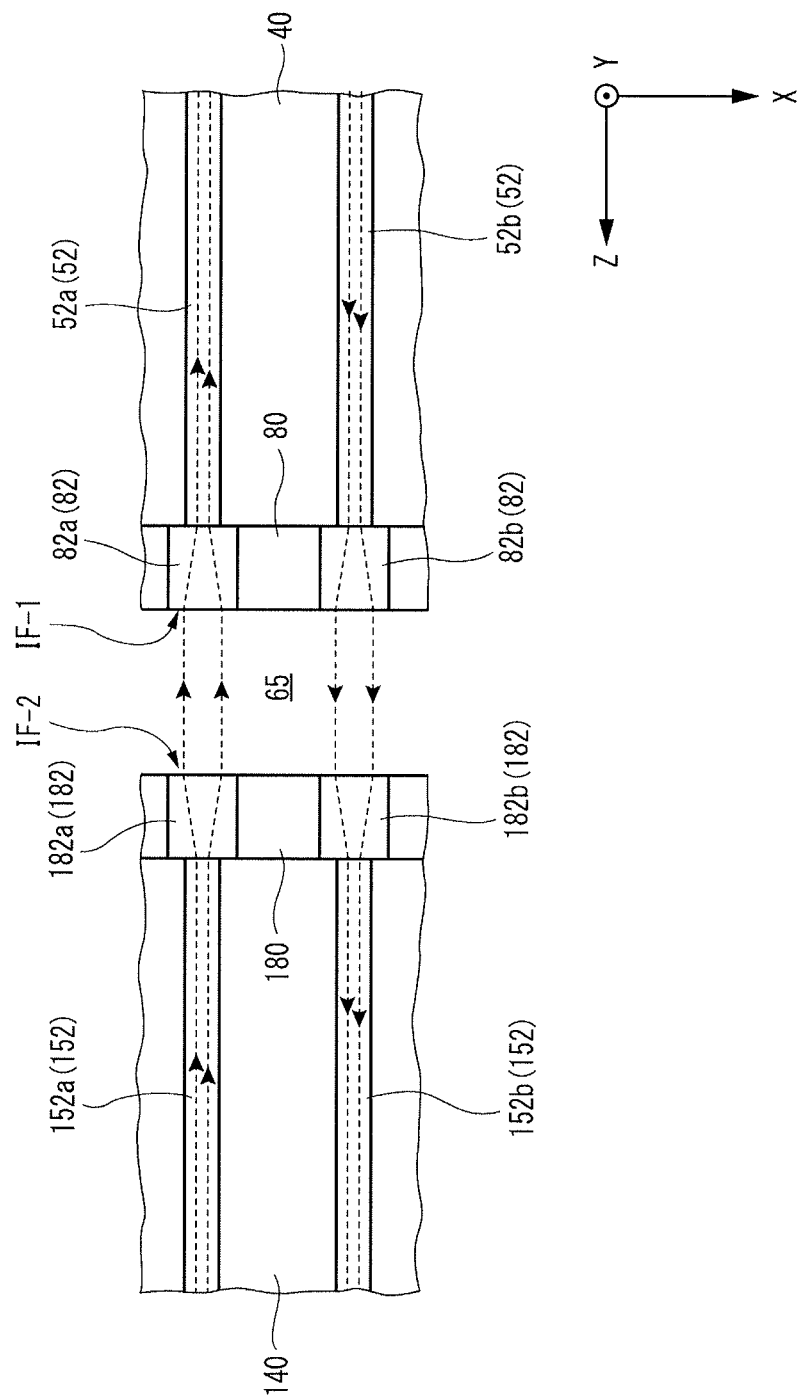
FIG. 6 is a pictorial view for illustrating an optical coupling between a first optical fiber and a second optical fiber shown in FIG. 4.

Next, the optical coupling between the first optical fiber 52 and the second optical fiber 152 is described with reference to FIG. 6. FIG. 6 is a pictorial view for illustrating the optical coupling between the first optical fiber 52 and the second optical fiber 152.

In the meantime, for convenience of explanations, among the plurality of first optical fibers 52 held at the receptacle ferrule 40, a reception-side optical fiber is referred to as a first optical fiber 52a and a transmission-side optical fiber is referred to as a first optical fiber 52b. Likewise, among the plurality of second optical fibers 152 held at the plug ferrule 140, a transmission-side optical fiber is referred to as a second optical fiber 152a and a reception-side optical fiber is referred to as a second optical fiber 152b. Both the first optical fiber 52 and the second optical fiber 152 are single mode optical fibers.

Also, the first lens array 80 has the plurality of GRIN lenses 82, and configures the receptacle interface part IF-1. The plurality of GRIN lenses 82 includes a GRIN lens 82a optically coupled with the first optical fiber 52a and a GRIN lens 82b optically coupled with the first optical fiber 52b.

Likewise, the second lens array 180 has the plurality of GRIN lenses 182, and configures the plug interface part IF-2. The plurality of GRIN lenses 182 includes a GRIN lens 182a optically coupled with the second optical fiber 152a and a GRIN lens 182b optically coupled with the second optical fiber 152b.

The light beams propagating in the first optical fibers 52b in the +Z direction and incident to the GRIN lenses 82b are expanded by the GRIN lenses 82b and are emitted from the receptacle interface part IF-1 towards the opening 65. The GRIN lenses 82b are configured to collimate the diverging lights emitted from the first optical fibers 52b and to convert the same into the substantially parallel lights.

The light beams emitted from the receptacle interface part IF-1 propagate in the opening 65 in the +Z direction and are incident to the plug interface part IF-2. Then, the light beams are condensed on the end surfaces of the second optical fibers 152b by the GRIN lenses 182b, and propagate in the second optical fibers 152b in the +Z direction. In this way, the first optical fibers 52b and the second optical fibers 152b are optically coupled to each other through the receptacle interface part IF-1 and the plug interface part IF-2.

Likewise, the second optical fibers 152a and the first optical fibers 52a are also optically coupled to each other through the receptacle interface part IF-1 and the plug interface part IF-2.

According to the optical connector coupling system 1, the light beams are expanded between the receptacle interface part IF-1 and the plug interface part IF-2. Thereby, it is possible to suppress the connection loss, which is caused due to the axis deviation between the receptacle connector 10 and the plug connector 100 in the plane (XY plane) orthogonal to the optical coupling direction (Z-axis direction). Therefore, it is possible to provide the optical coupling structure in which the lowering of the optical characteristics due to the axis deviation is suppressed (the tolerance is high).

Also, since the high size precision is not required for the guide pins 63 configured to position the receptacle connector 10 and the plug connector 100, it is possible to provide the optical connector coupling system 1 having good optical characteristics at low cost. In an example of the exemplary embodiment, as the guide pin 63, a relatively inexpensive guide pin for a multimode optical fiber can be adopted. The guide pin for a multimode optical fiber is a guide pin that is normally used for an optical connector configured to optically couple multimode optical fibers, and a difference between a diameter of the guide pin 63 and an inner diameter of the guide hole 184 is equal to or less than 2 μm, for example.

In general, the single mode optical fibers are optically coupled using the guide pins for a single mode optical fiber. In this case, a difference between the diameter of the guide pin and the inner diameter of the guide hole is equal to or less than 1 μm. In the meantime, according to the optical connector coupling system 1 of the exemplary embodiment, even when the difference between the diameter of the guide pin 63 and the inner diameter of the guide hole 184 is greater than 1 μm and equal to or less than 2 μm, the lowering of the optical characteristics between the second optical fiber 152a and the first optical fiber 52a is small. In this way, it is possible to save the manufacturing cost of the optical connector coupling system 1 by using the guide pins for a multimode optical fiber to optically couple the single mode optical fibers.

(First Modified Example)

Figure 7:
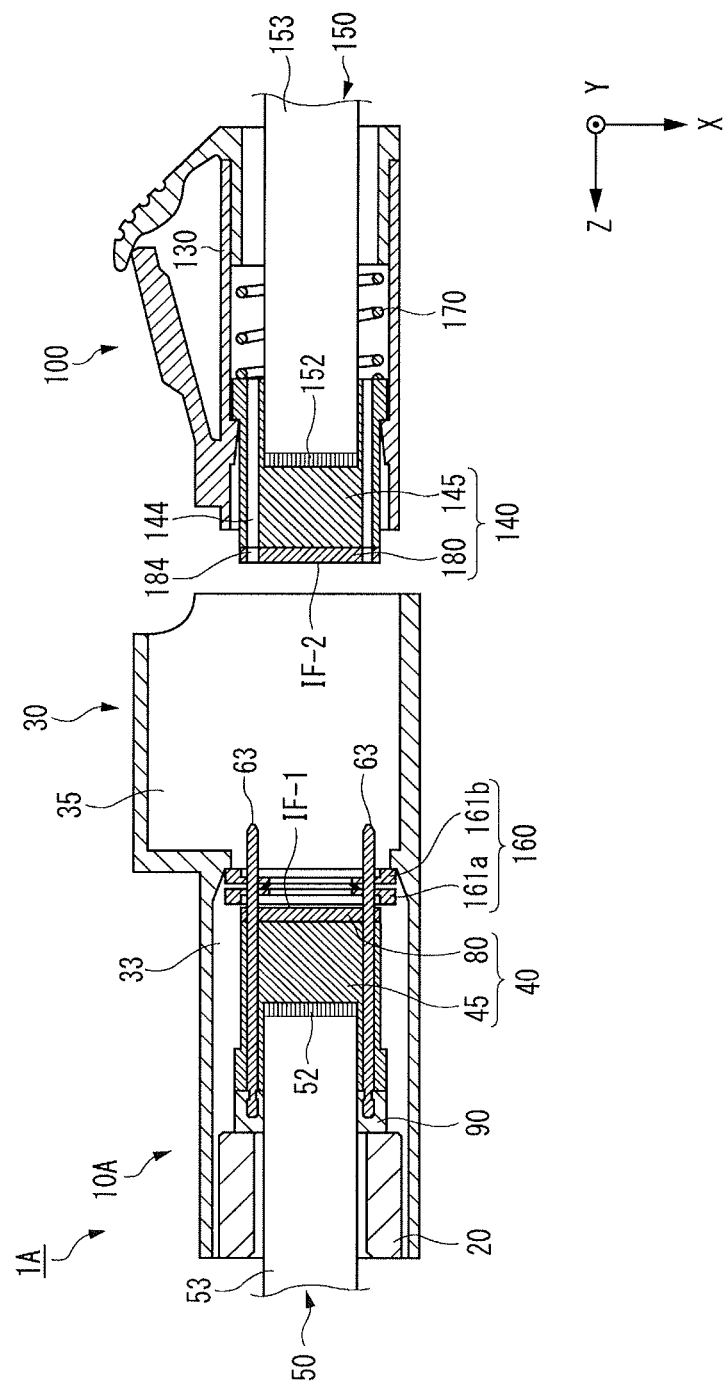
FIG. 7 is a sectional view of the optical connector coupling system at the first state, which has a receptacle connector according to a first modified example of the exemplary embodiment.
Figure 8:
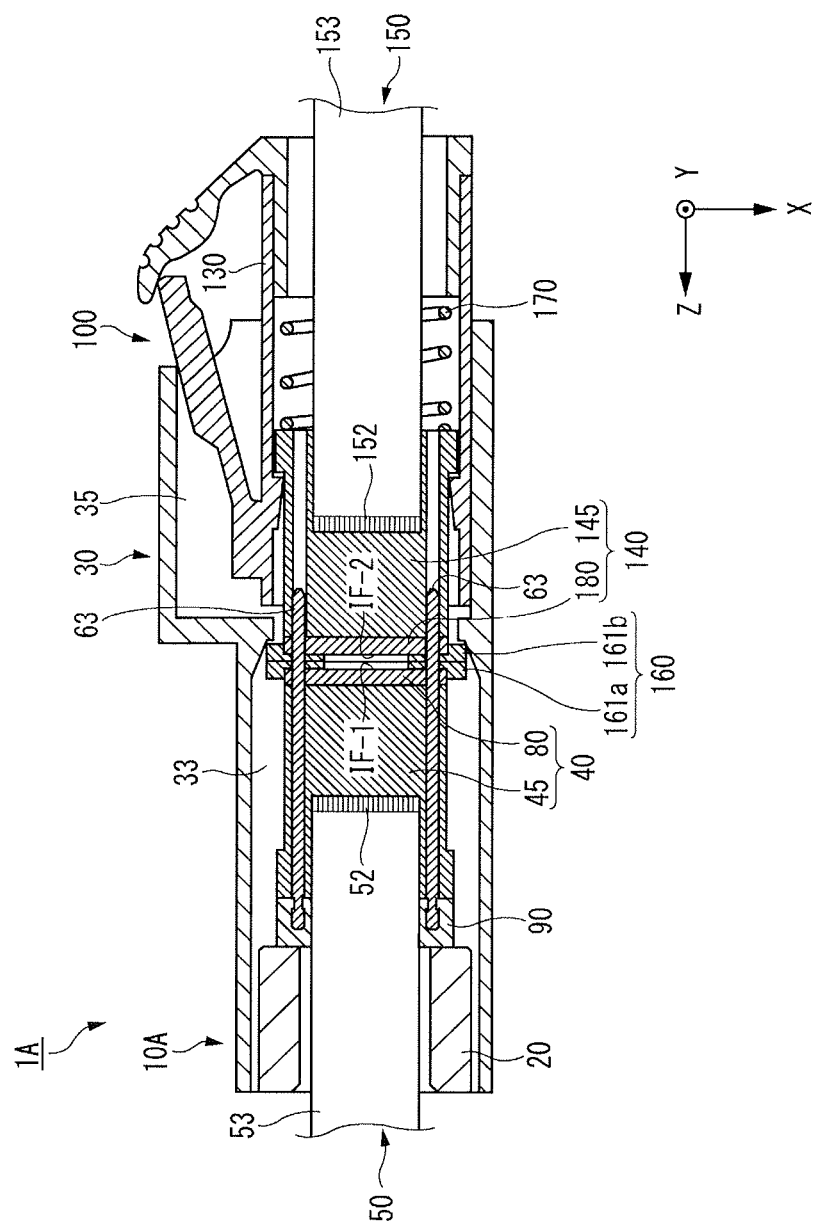
FIG. 8 is a sectional view of the optical connector coupling system at the second state, which has the receptacle connector according to the first modified example of the exemplary embodiment.
Figure 9A:
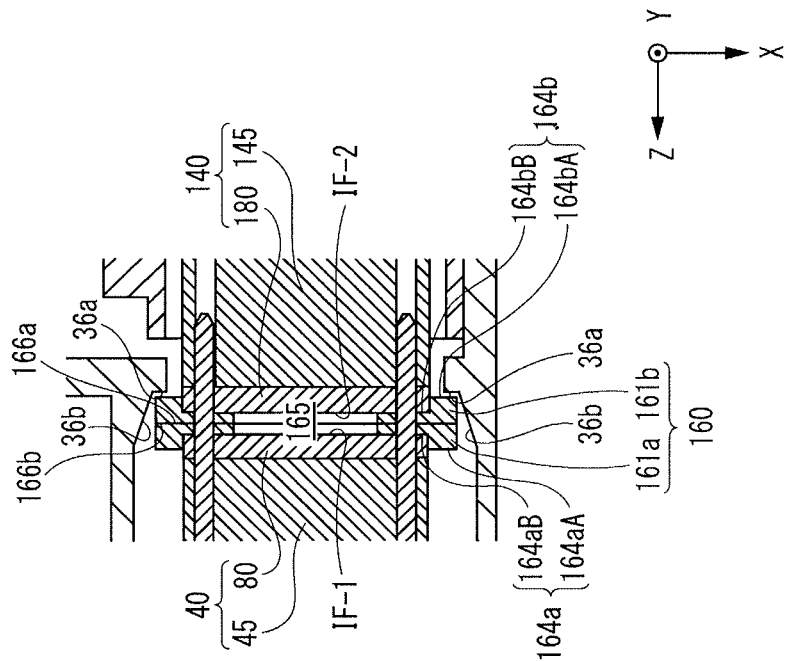
FIG. 9A is an enlarged sectional view depicting a spacer shown in FIG. 7 and the vicinity thereof.
Figure 9B:
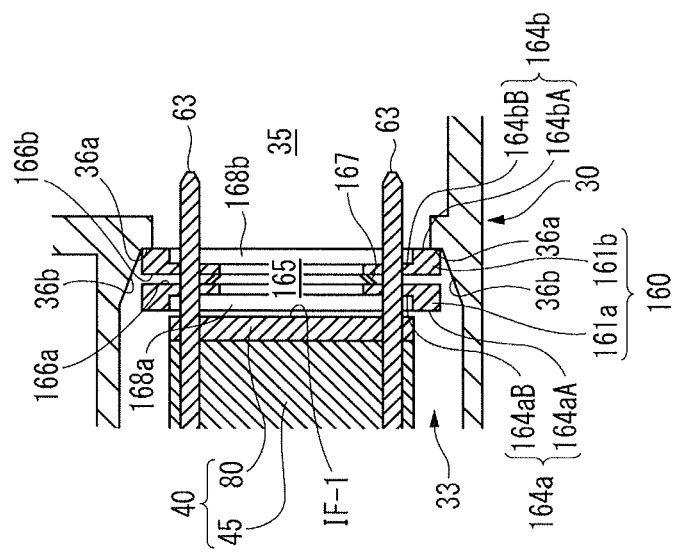
FIG. 9B is an enlarged sectional view depicting the spacer shown in FIG. 8 and the vicinity thereof.

Next, an optical connector coupling system 1A having a receptacle connector 10A according to a first modified example of the exemplary embodiment is described with reference to FIGS. 7 to 9B. FIG. 7 is a sectional view of the optical connector coupling system 1A at the first state. FIG. 8 is a sectional view of the optical connector coupling system 1A at the second state. FIG. 9A is an enlarged sectional view depicting a spacer 160 shown in FIG. 7 and the vicinity thereof. FIG. 9B is an enlarged sectional view depicting the spacer 160 shown in FIG. 8 and the vicinity thereof. In the meantime, since the members having the same reference numerals as the members described in the exemplary embodiment have the same configurations, the descriptions thereof are omitted.

A configuration of the optical connector coupling system 1A shown in FIG. 7 is different from the optical connector coupling system 1 of the exemplary embodiment, in that the spacer 160, instead of the spacer 60 of the exemplary embodiment, is used for the receptacle connector 10A. Therefore, a configuration of the spacer 160 is described in the below.

As shown in FIG. 9A, the spacer 160 has a first spacer part 161a, a second spacer part 161b, and a plate spring 167. The first spacer part 161a and the second spacer part 161b have the same configuration. Also, the spacer 160 has an opening 165 (light transmission part) extending in the Z-axis direction The first spacer part 161a has an outer surface 164a (a first surface of the spacer 160), an inner surface 166a positioned at an opposite side to the outer surface 164a, and a recess portion 168a. The outer surface 164a configured to function as the first surface of the spacer 160 has an outermost surface 164aA, and a bottom surface 164aB of the recess portion 168a. The recess portion 168a having a substantially cuboid shape is formed at the outermost surface 164aA of the first spacer part 161a, and is configured to communicate with the opening 165. Both ends of the first spacer part 161a in the X-axis direction are formed with guide pin holding holes for holding the guide pins 63.

The second spacer part 161b has an outer surface 164b (a second surface of the spacer 160), an inner surface 166b positioned at an opposite side to the outer surface 164b, and a recess portion 168b. The outer surface 164b configured to function as the second surface of the spacer 160 has an outermost surface 164bA, and a bottom surface 164bB of the recess portion 168b.

The inner surface 166b is configured to face the inner surface 166a of the first spacer part 161a. As shown in FIG. 9B, at the second state, the inner surface 166a and the inner surface 166b are contacted to each other. The recess portion 168b having the same shape as the recess portion 168a is formed at the outermost surface 164bA of the second spacer part 161b and is configured to communicate with the opening 165. Both ends of the second spacer part 161b in the X-axis direction are formed with guide pin holding holes for holding the guide pins 63 and are configured to communicate with the opening 165.

The plate spring 167 is configured to elastically connect the first spacer part 161a and the second spacer part 161b. Meanwhile, in the first modified example, the plate spring 167 may be another member having elasticity.

When the first spacer part 161a and the second spacer part 161b are connected each other via the pair of guide pins 63, a plate spring accommodation space (not shown) for accommodating the plate spring 167 is formed by a plate spring accommodation part (not shown) of the second spacer part 161b and a plate spring accommodation part (not shown) of the first spacer part 161a. At a state where the plate spring 167 is accommodated in the plate spring accommodation space, the first spacer part 161a and the second spacer part 161b are elastically connected each other via the plate spring 167.

At the first state shown in FIGS. 7 and 9A, the first spacer part 161a and the second spacer part 161b are arranged to face each other with being spaced from each other by the elastic force of the plate spring 167. At this state, the outermost surface 164bA of the second spacer part 161b is contacted to the inner wall surface 36a of the first cavity 33, and the bottom surface 164aB of the first spacer part 161a is spaced from the first lens array 80. Also, at this state, side surfaces of the first spacer part 161a and the second spacer part 161b are spaced from the inner wall surface 36b.

The plug connector 100 is moved in the +Z direction from the first state shown in FIG. 7, so that the plug connector 100 is accommodated in the second cavity 35 of the receptacle housing 30 and the guide pins 63 are inserted into the pair of guide holes 184 and the guide pin insertion holes 144 of the plug connector 100, respectively. Further, when the plug connector 100 is moved in the +Z direction, the front surface of the second lens array 180 is first contacted to the bottom surface 164bB of the second spacer part 161b. Then, when the plug connector 100 is further moved in the +Z direction at the state where the front surface of the second lens array 180 is contacted to the bottom surface 164bB, the plate spring 167 is contracted in the Z-axis direction, so that the second spacer part 161b is moved in the +Z direction. In this way, the outermost surface 164bA of the second spacer part 161b is spaced from the inner wall surface 36a. Then, after the inner surface 166b of the second spacer part 161b is contacted to the inner surface 166a of the first spacer part 161a, the first lens array 80 is contacted to the bottom surface 164aB of the first spacer part 161a. At this state, the plug connector 100 is fixed to the receptacle housing 30.

At the second state shown in FIGS. 8 and 9A, the receptacle interface part IF-1 and the plug interface part IF-2 are arranged to face each other at a predetermined interval with the first lens array 80 being contacted to the bottom surface 164aB of the first spacer part 161a and the second lens array 180 being contacted to the bottom surface 164bB of the second spacer part 161b. In the first modified example, the predetermined interval is a distance between the bottom surface 164aB and the bottom surface 164bB in the Z-axis direction, and can be appropriately changed depending on the design of the spacer 160.

Also, at the second state, the spacer 160 is accommodated in the receptacle housing 30 at the floating state. Therefore, the receptacle ferrule 40 and the spacer 160 are accommodated in the receptacle housing 30 at the floating state, and the plug ferrule 140 is accommodated in the plug housing 130 at the floating state.

Also, the elastic force of the plate spring 167 in the Z-axis direction is set to be less than the elastic force of the spring 170 of the plug connector 100 in the Z-axis direction. Thereby, when moving the plug connector 100 in the +Z direction, it is possible to space the outermost surface 164bA of the second spacer part 161b from the inner wall surface 36a.

According to the spacer 160 of the first modified example, the distance between the outer surface 164a and the outer surface 164b at the second state is smaller than the distance between the outer surface 164a and the outer surface 164b at the first state. In this way, it is possible to easily implement the state where the outer surface 164b of the spacer 160 is contacted to or spaced from the inner wall surface 36a by the change in the distance between the outer surface 164a and the outer surface 164b of the spacer 160.

(Second Modified Example)

Figure 10:
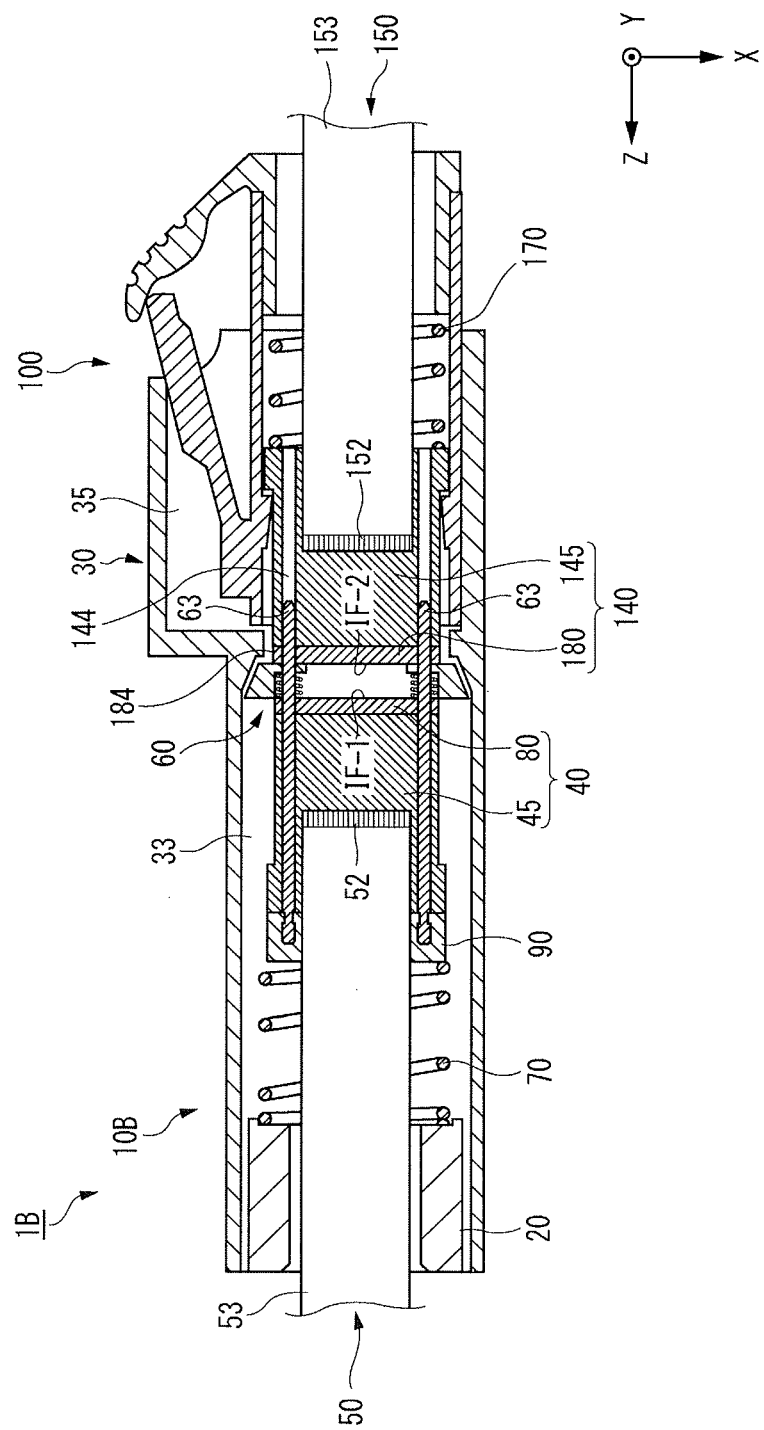
FIG. 10 is a sectional view of the optical connector coupling system at the second state, which has a receptacle connector according to a second modified example of the exemplary embodiment.

Next, an optical connector coupling system 1B having a receptacle connector 10B according to a second modified example of the exemplary embodiment is described with reference to FIG. 10. FIG. 10 is a sectional view of the optical connector coupling system 1B at the second state. In the meantime, since the members having the same reference numerals as the members described in the exemplary embodiment and first modified example have the same configurations, the descriptions thereof are omitted.

The optical connector coupling system 1B shown in FIG. 10 is different from the optical connector coupling system 1 of the exemplary embodiment, in that a spring 70 (second elastic member) is used for the receptacle connector 10B. Therefore, configurations and operational effects of the spring 70 are described in the below.

As shown in FIG. 10, the spring 70 is arranged between the pin keeper 90 and the support member 20. The elastic force of the spring 70 in the Z-axis direction is set to be greater than the elastic force of the coil springs 67 in the Z-axis direction. Also, at the second state shown in FIG. 10, the elastic force of the spring 70 in the Z-axis direction is balanced with the elastic force of the spring 170 of the plug connector 100 in the Z-axis direction. In the meantime, during a shift state from the first state to the second state, the elastic force of the spring 70 in the Z-axis direction is less than the elastic force of the spring 170 of the plug connector 100 in the Z-axis direction. Meanwhile, in the second modified example, the spring 70 may be another member having elasticity.

Next, a shift process from the first state to the second state is described with reference to FIGS. 10 and 5B. The plug connector 100 is moved in the +Z direction from the first state, so that the plug connector 100 is accommodated in the second cavity 35 of the receptacle housing 30 and the guide pins 63 are inserted into the pair of guide holes 184 and the guide pin insertion holes 144 of the plug connector 100, respectively. Further, when the plug connector 100 is moved in the +Z direction, the front surface of the second lens array 180 is first contacted to the second surface 64b of the spacer 60.

Then, when the plug connector 100 is further moved in the +Z direction at the state where the front surface of the second lens array 180 is contacted to the second surface 64b of the spacer 60, the spacer 60 is moved in the +Z direction and the spring 70 is contracted in the +Z direction by the contraction of the coil springs 67 in the Z-axis direction. In this way, the first surface 64a of the spacer 60 is contacted to the first lens array 80, and the second surface 64b of the spacer 60 is spaced from the inner wall surface 36a of the receptacle housing 30.

Thereafter, when the plug connector 100 is fixed to the receptacle housing 30, the receptacle ferrule 40 and the plug ferrule 140 are stopped and the receptacle interface part IF-1 and the plug interface part IF-2 are positioned with respect to each other via the spacer 60 (the second state) at the position at which the elastic force of the spring 70 and the elastic force of the spring 170 are balanced.

At the second state, the receptacle ferrule 40 and the spacer 160 are accommodated in the receptacle housing 30 at the floating state, and the plug ferrule 140 is accommodated in the plug housing 130 at the floating state.

According to the receptacle connector 10B of the second modified example, the spring 70 is configured to be elastically deformed in the +Z direction so as to be spaced from the second surface 64b of the spacer 60. In this way, the spring 70 is elastically deformed in the +Z direction together with the coil springs 67, so that it is possible to easily implement the state where the second surface 64b of the spacer 60 is contacted to or spaced from the inner wall surface 36a of the receptacle housing 30.

Further, at the second state, even when a tensile force is applied to the optical cable 150 of the plug connector 100 in the −Z direction, since the spring 70 is elongated in the −Z direction by the tensile force, the plug ferrule 140 is difficult to separate from the receptacle ferrule 40. In this way, the spring 70 is provided, so that it is possible to provide the receptacle connector of which reliability against the external force is further improved.

(Third Modified Example)

Figure 11A:
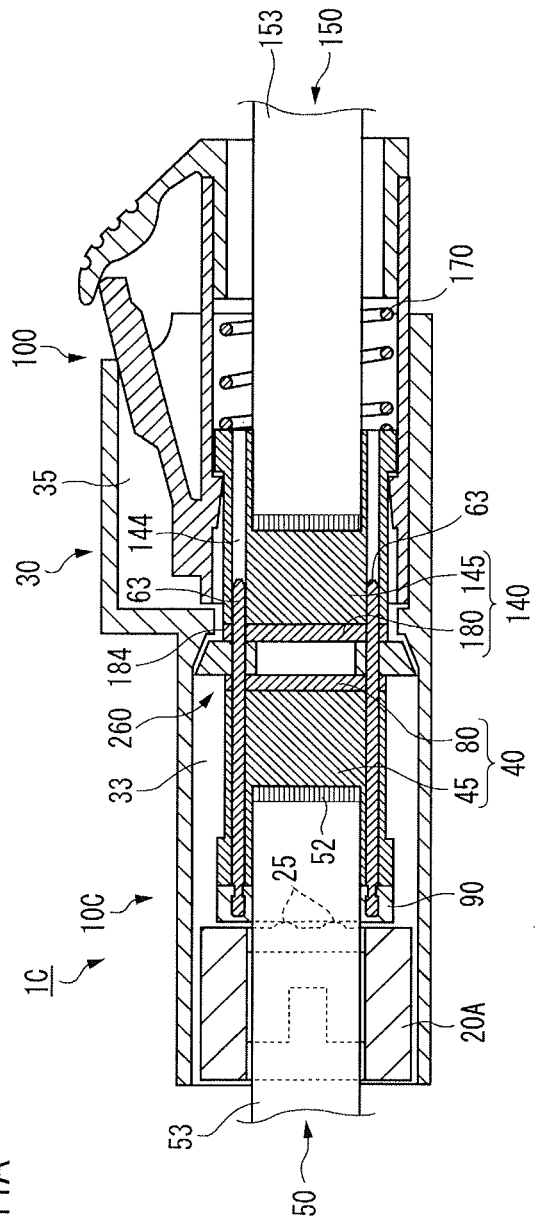
FIG. 11A is a sectional view of the optical connector coupling system at the second state, which has a receptacle connector according to a third modified example of the exemplary embodiment.
Figure 11B:
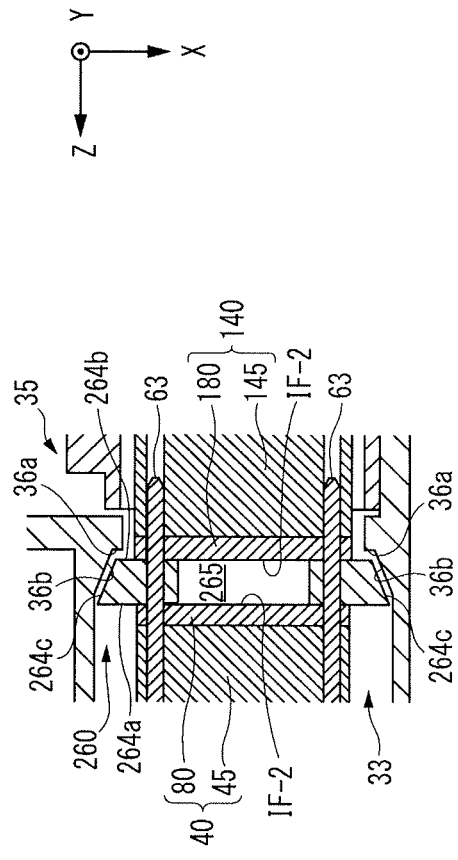
FIG. 11B is an enlarged sectional view depicting a spacer shown in FIG. 11A and the vicinity thereof.
Figure 12:
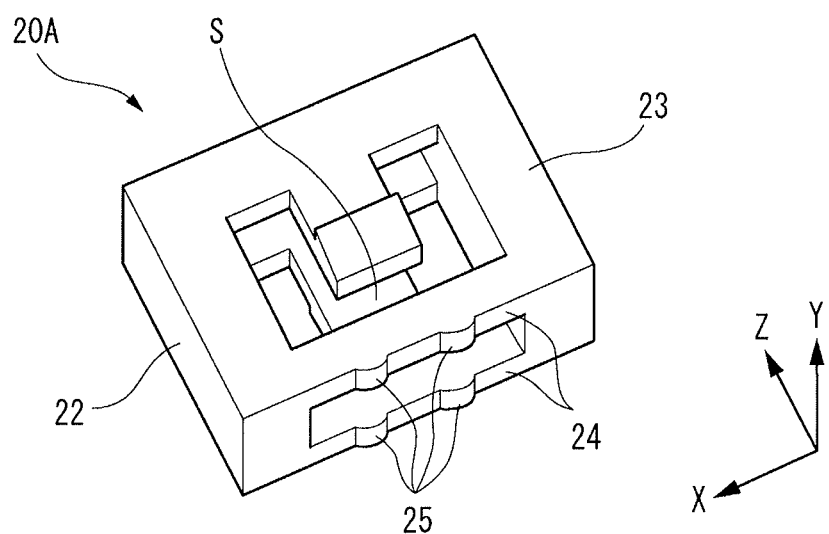
FIG. 12 is a perspective view of a support member shown in FIG. 11A.

Next, an optical connector coupling system 1C having a receptacle connector 10C according to a third modified example of the exemplary embodiment is described with reference to FIGS. 11A, 11B and 12. FIG. 11A is a sectional view of the optical connector coupling system 1C at the second state, which has the receptacle connector 10C according to the third modified example. FIG. 11B is an enlarged sectional view depicting a spacer 260 shown in FIG. 11A and the vicinity thereof. FIG. 12 is a perspective view of a support member 20A shown in FIG. 11A. In the meantime, since the members having the same reference numerals as the members described in the exemplary embodiment and modified examples have the same configurations, the descriptions thereof are omitted.

The optical connector coupling system 1C shown in FIG. 11A is different from the optical connector coupling system 1 of the exemplary embodiment, in that the receptacle connector 10C is provided instead of the receptacle connector 10. Further, the optical connector coupling system 1C shown in FIG. 11A is different from the optical connector coupling system 1 of the exemplary embodiment, in that the spacer 260 is provided instead of the spacer 60 of the exemplary embodiment and the pair of coil springs 67 is not provided. Therefore, configurations of the spacer 260 and the support member 20A are described in the below.

As shown in FIG. 11B, the receptacle connector 10C is not provided with the coil springs 67 configured to elastically connect the first lens array 80 and the spacer, as compared to the spacer 60 of the exemplary embodiment. Therefore, the spacer 260 is not formed with the recess portions for accommodating therein the coil springs. The spacer 260 has a first surface 264a, a second surface 264b positioned at an opposite side to the first surface 264a, an inclined side surface 264c positioned between the first surface 264a and the second surface 264b, and an opening 265 penetrating the spacer 260 in the Z-axis direction.

As shown in FIGS. 11A and 12, the support member 20A has pillar-shaped parts 22, 23 arranged to face each other and a pair of elastically deformable parts 24 formed between the pillar-shaped parts 22, 23. The respective elastically deformable parts 24 are integrally formed with the pillar-shaped parts 22, 23 and have two projections 25 in the X-axis direction. Each elastically deformable part 24 is configured to be elastically deformed in the Z-axis direction when a pressing force is applied thereto in the Z-axis direction. At the state shown in FIG. 11A, the respective projections 25 are contacted to the pin keeper 90, and the pressing force applied in the +Z direction from the receptacle ferrule 40 is concentrated on specific portions of the elastically deformable parts 24 through the respective projections 25. Further, the support member 20A is formed with a space part S. By this configuration, the elastically deformable parts 24 can be easily elastically deformed in the Z-axis direction.

At the second state shown in FIG. 11A, the elastic force of the elastically deformable parts 24 in the Z-axis direction is balanced with the elastic force of the spring 170 of the plug connector 100 in the Z-axis direction. In the meantime, during the shift state from the first state to the second state, the elastic force of the elastically deformable parts 24 in the Z-axis direction is less than the elastic force of the spring 170 of the plug connector 100 in the Z-axis direction.

Subsequently, a shift process from the first state to the second state is described with reference to FIG. 11A. The plug connector 100 is moved in the +Z direction from the first state, so that the plug connector 100 is accommodated in the second cavity 35 of the receptacle housing 30 and the guide pins 63 are inserted into the pair of guide holes 184 and the guide pin insertion holes 144 the plug connector 100, respectively. Further, when the plug connector 100 is moved in the +Z direction, the front surface of the second lens array 180 is first contacted to the second surface 264b of the spacer 260.

Then, when the plug connector 100 is further moved in the +Z direction at the state where the front surface of the second lens array 180 is contacted to the second surface 264b of the spacer 260, the elastically deformable parts 24 are elastically deformed in the +Z direction via the projections 25 by the pressing force in the +Z direction. In this way, the second surface 264b of the spacer 260 is spaced from the inner wall surface 36a of the receptacle housing 30.

Thereafter, when the plug connector 100 is fixed to the receptacle housing 30, the receptacle ferrule 40 and the plug ferrule 140 are stopped and the receptacle interface part IF-1 and the plug interface part IF-2 are positioned with respect to each other via the spacer 260 (the second state) at the position at which the elastic force of the elastically deformable parts 24 and the elastic force of the spring 170 are balanced.

At the second state, the receptacle ferrule 40 and the spacer 260 are accommodated in the receptacle housing 30 at the floating state, and the plug ferrule 140 is accommodated in the plug housing 130 at the floating state.

According to the receptacle connector 10C of the third modified example, the elastically deformable parts 24, which are portions of the support member 20A, are configured to be elastically deformed in the +Z direction so as to be spaced from the second surface 264b of the spacer 260. In this way, the elastically deformable parts 24 are elastically deformed in the +Z direction, so that it is possible to easily implement the state where the second surface 264b of the spacer 260 is contacted to or spaced from the inner wall surface 36a of the receptacle housing 30.

Further, at the second state, even when the tensile force is applied to the optical cable 150 of the plug connector 100 in the −Z direction, since the elastically deformable parts 24 are elastically deformed in the −Z direction by the tensile force, the plug ferrule 140 is difficult to separate from the receptacle ferrule 40. In this way, the support member 20A is provided, so that it is possible to provide the receptacle connector of which reliability against the external force is further improved.

According to the receptacle connector 10C of the third modified example, it is possible to reduce the number of components. Therefore, it is possible to save the manufacturing cost of the receptacle connector and to shorten the length of the receptacle connector in the Z-axis direction.

(Fourth Modified Example)

Figure 13:
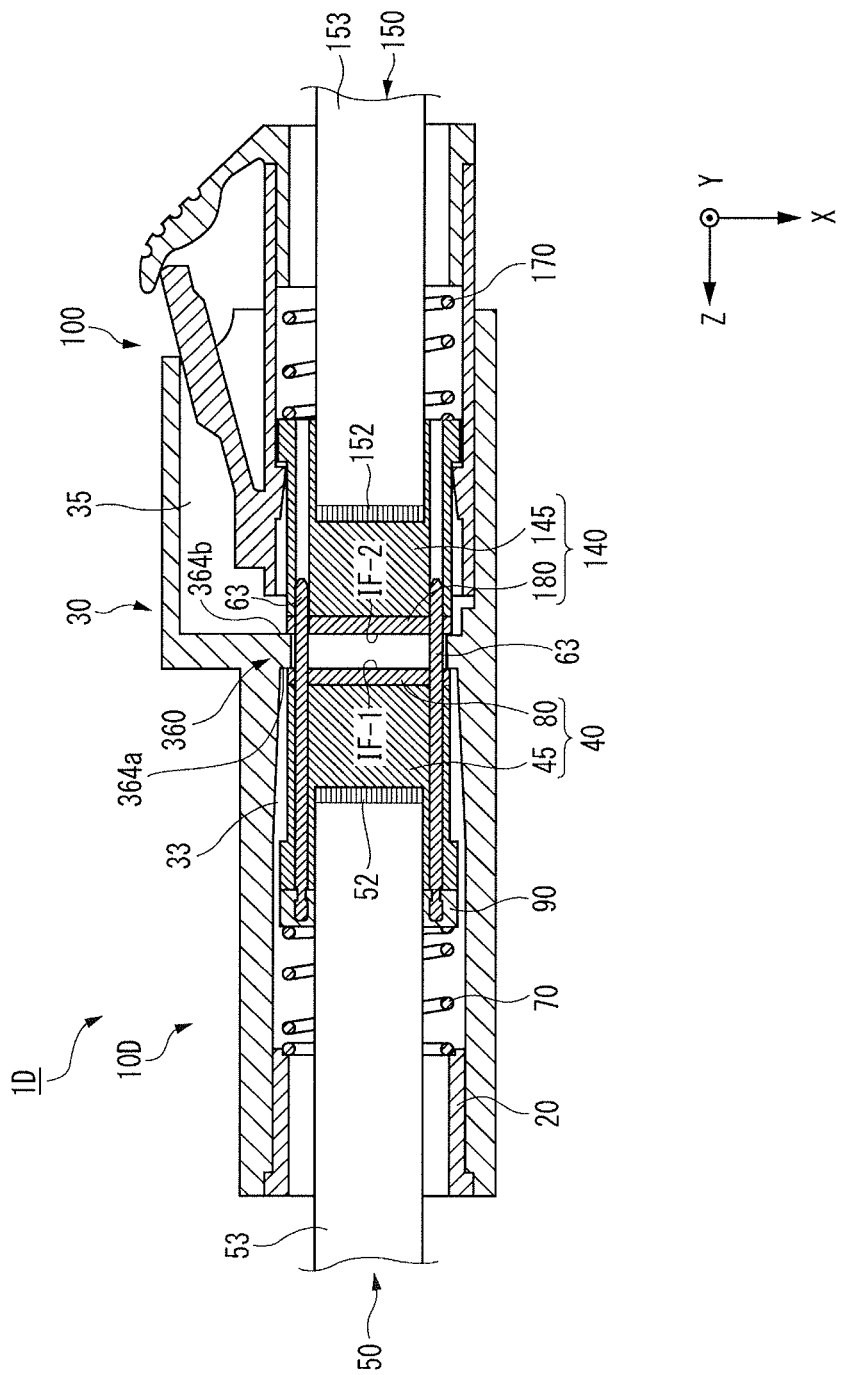
FIG. 13 is a sectional view of the optical connector coupling system at the second state, which has a receptacle connector according to a fourth modified example of the exemplary embodiment.

Next, an optical connector coupling system 1D having a receptacle connector 10D according to a fourth exemplary embodiment of the exemplary embodiment is described with reference to FIG. 13. FIG. 13 is a sectional view of the optical connector coupling system 1D at the second state, which has the receptacle connector 10D according to the fourth modified example. In the meantime, since the members having the same reference numerals as the members described in the exemplary embodiment and modified examples have the same configurations, the descriptions thereof are omitted.

The optical connector coupling system 1D shown in FIG. 13 is largely different from the exemplary embodiment and the respective modified examples, in that the spacer is not floated with respect to the receptacle housing 30 at the second state. Particularly, in the fourth modified example, a spacer 360 is integrally formed with the receptacle housing 30.

The spacer 360 integrally formed with the receptacle housing 30 has a first surface 364a configured to contact the first lens array 80, a second surface 364b positioned at an opposite side to the first surface 364a and configured to contact the second lens array 180, and an opening 365 configured to enable the light beams propagating between the receptacle interface part IF-1 and the plug interface part IF-2 to pass therethrough.

In the fourth modified example, the first lens array 80 is pressed to the first surface 364a by the elastic force of the spring 70 in the −Z direction at any state of the first state and the second state. In the meantime, the second lens array 180 is pressed to the second surface 364b by the elastic force of the spring 170 in the +Z direction at the second state.

At the second state shown in FIG. 13, the receptacle interface part IF-1 and the plug interface part IF-2 are arranged to face each other at a predetermined interval (a thickness of the spacer 360 in the Z-axis direction) with the first lens array 80 being contacted to the first surface 364a and the second lens array 180 being contacted to the second surface 364b. In this way, also in the fourth modified example, it is possible to provide the optical connector coupling system capable of increasing the degrees of design freedom of the receptacle ferrule 40 and the plug ferrule 140.

Although the exemplary embodiments of the present invention have been described, the technical scope of the present invention is not construed to be limited to the exemplary embodiments. One skilled in the art can understand that the exemplary embodiments are just exemplary and a variety of changes to the exemplary embodiments can be made within the scope defined in the claims. The technical scope of the present invention should be determined on the basis of the scope defined in the claims and the equivalent scope thereto.

For example, in the exemplary embodiment, the receptacle interface part IF-1 and the plug interface part IF-2 include the GRIN lenses. However, instead of the GRIN lenses, the collimate lenses may also be used.

Also, in the exemplary embodiment, the first lens array 80 functioning as the first front end portion is separately configured from the first main body part 45, and the second lens array 180 functioning as the second front end portion is separately configured from the second main body part 145. However, the first lens array 80 may be integrally formed with the first main body part 45, and the second lens array 180 may be integrally formed with the second main body part 145. That is, the first front end portion and the second front end portion should be understood as the end portions of the receptacle ferrule and the plug ferrule and should not be construed to be limited to the first lens array 80 and the second lens array 180 of the exemplary embodiments.

Also, the receptacle interface part IF-1 is flush with the front surface of the first lens array 80. However, the receptacle interface part IF-1 may be provided at a position recessed from the front surface. Likewise, the plug interface part IF-2 may be provided at a position recessed from the front surface of the second lens array 180.

Also, in the second modified example of the exemplary embodiment, the spacer 60 is used. However, instead of the spacer 60, the spacer 160 of the first modified example or the spacer 260 of the third modified example may also be used. Also in this case, the spacer can be floated from the receptacle housing 30.

Also, in the third modified example of the exemplary embodiment, the spacer 260 is used. However, instead of the spacer 260, the spacer 60 of the exemplary embodiment or the spacer 160 of the first modified example may also be used. Also in this case, the spacer can be floated from the receptacle housing 30.

What is claimed is:

1. A receptacle connector comprising:
    a receptacle ferrule having:
        a first holding part configured to hold an end portion of a first optical fiber, and
        a first front end portion having a receptacle interface part configured to be optically coupled with the first optical fiber;
    a receptacle housing in which the receptacle ferrule and a plug connector having a second front end portion having a plug interface part configured to be optically coupled with the receptacle interface part are to be accommodated; and
    a spacer having:
        a first surface configured to contact the first front end portion;
        a second surface positioned at an opposite side to the first surface and configured to contact the second front end portion, and
        a light transmission part configured to enable a light beam propagating between the receptacle interface part and the plug interface part to pass therethrough,
    the spacer being arranged in the receptacle housing,
    wherein at a state where the first front end portion is contacted to the first surface of the spacer and the second front end portion is contacted to the second surface of the spacer, the receptacle interface part and the plug interface part face each other at a predetermined interval,
    wherein at a first state where the receptacle interface part and the plug interface part are not positioned with respect to each other via the spacer, the second surface of the spacer is contacted to an inner wall surface defining a cavity of the receptacle housing, and
    wherein at a second state where the receptacle interface part and the plug interface part are positioned with respect to each other via the spacer, the second surface of the spacer is spaced from the inner wall surface.

2. The receptacle connector according to claim 1, wherein a distance between the first front end portion and the second surface of the spacer at the second state is smaller than a distance between the first front end portion and the second surface of the spacer at the first state.

3. The receptacle connector according to claim 2, wherein a distance between the first surface and the second surface of the spacer at the first state is the same as a distance between the first surface and the second surface of the spacer at the second state.

4. The receptacle connector according to claim 2, wherein a distance between the first surface and the second surface of the spacer at the second state is smaller than a distance between the first surface and the second surface of the spacer at the first state.

5. The receptacle connector according to claim 1, further comprising:
    a support member arranged in the receptacle housing so as to support the receptacle ferrule, and configured to restrain movement of the receptacle ferrule in an insertion direction in which the plug connector is to be inserted into the receptacle housing; and
    a first elastic member configured to elastically connect the first front end portion and the spacer,
    wherein the first elastic member is configured to be elastically deformed so that a distance between the first front end portion and the second surface of the spacer at the second state is smaller than a distance between the first front end portion and the second surface of the spacer at the first state.

6. The receptacle connector according to claim 1, further comprising:
    a support member arranged in the receptacle housing so as to support the receptacle ferrule, and configured to restrain movement of the receptacle ferrule in an insertion direction in which the plug connector is to be inserted into the receptacle housing; and
    an elastic member arranged between the receptacle ferrule and the support member and configured to be elastically deformed in the insertion direction so that the second surface of the spacer is spaced from the inner wall surface.

7. The receptacle connector according to claim 1, further comprising:
- a support member arranged in the receptacle housing so as to support the receptacle ferrule, and configured to restrain movement of the receptacle ferrule in an insertion direction in which the plug connector is to be inserted into the receptacle housing,
- wherein a part of the support member is configured to be elastically deformed in the insertion direction so that the second surface of the spacer is spaced from the inner wall surface.

8. The receptacle connector according to claim 1, wherein the receptacle housing has a first cavity configured to accommodate therein the receptacle ferrule and the spacer, and a second cavity configured to accommodate therein the plug connector, and
- wherein an opening area of the first cavity on a cross-sectional surface orthogonal to an insertion direction in which the plug connector is to be inserted into the receptacle housing is smaller than an opening area of the second cavity.

9. The receptacle connector according to claim 1, further comprising:
- a guide pin for a multimode optical fiber,
- wherein the receptacle interface part is configured to expand a light beam emitted from the first optical fiber,
- wherein the plug interface part is configured to optically couple with a second optical fiber and to condense the light beam emitted from the receptacle interface part on the second optical fiber,
- wherein the first optical fiber and the second optical fiber are optical fibers for a single mode, and
- wherein the receptacle interface part and the plug interface part are positioned with respect to each other at a state where the guide pin is inserted into a guide hole formed at the receptacle ferrule and a guide hole formed at the plug connector.

* * * * *